United States Patent [19]

Crouch

[11] Patent Number: 5,650,207
[45] Date of Patent: Jul. 22, 1997

[54] AIRBAG FABRIC

[75] Inventor: Earl T. Crouch, High Point, N.C.

[73] Assignee: Highland Industries, Inc., Greensboro, N.C.

[21] Appl. No.: 536,349

[22] Filed: Sep. 29, 1995

[51] Int. Cl.$^6$ ............................. B32B 1/08; B60R 21/16; D03D 47/30

[52] U.S. Cl. ................. 428/36.1; 139/389; 139/435.1; 280/728.1; 422/181; 422/203

[58] Field of Search ........................ 428/225, 257, 428/299, 36.1, 229; 139/188 R, 389, 435.1; 280/728.1

[56] References Cited

U.S. PATENT DOCUMENTS

| | | |
|---|---|---|
| 3,799,574 | 3/1974 | Bonn et al. .................. 280/150 AB |
| 3,807,754 | 4/1974 | Redenbach .................. 280/150 AB |
| 3,892,425 | 7/1975 | Sakairi et al. ................ 280/150 AB |
| 4,921,735 | 5/1990 | Bloch ............................ 428/34.9 |
| 5,010,663 | 4/1991 | Thornton et al. .................... 38/52 |
| 5,093,163 | 3/1992 | Krummheuer et al. ............ 428/31.5 |
| 5,110,666 | 5/1992 | Menzel et al. ................... 428/196 |
| 5,178,408 | 1/1993 | Barrenscheen et al. ............. 280/728 |
| 5,236,775 | 8/1993 | Swoboda et al. .................. 428/225 |
| 5,277,966 | 1/1994 | Nakayama et al. ................ 428/225 |
| 5,296,278 | 3/1994 | Nishimura et al. ................ 428/36.1 |
| 5,421,378 | 6/1995 | Bowers et al. ................. 139/435.1 |

*Primary Examiner*—James J. Bell
*Attorney, Agent, or Firm*—Rhodes, Coats & Bennett, L.L.P.

[57] ABSTRACT

A high strength, uncoated, uncalendered airbag fabric that is lighter in weight than heretofore and exhibits an air permeability of less than 4 cfm per square foot of area at air pressures of one-half inch of water. The fabric is woven on a fluid jet loom from synthetic, continuous, multi-filament yarns having a denier in the range of 200 to 900.

12 Claims, 3 Drawing Sheets

5,650,207

AIRBAG FABRIC

BACKGROUND OF THE INVENTION

This invention relates to airbag fabrics, and more particularly, to high strength, uncoated, uncalendered airbag fabric that is lighter in weight than heretofore.

In the last several years, the use of airbags as safety restraints in automobiles has become prevalent and will be standard equipment on all cars within the next few years. Airbags typically used in restraint systems in automobiles and other vehicles must satisfy a number of unique and demanding requirements. For example, airbags must have the ability to inflate fully in milliseconds, absorb the impact of the passenger, yet deflate rapidly to provide pneumatic dampening, thus preventing the passenger from being repelled in a rearward direction. Additionally, the airbag fabric must be sufficiently low in air permeability that the gases released to inflate the bag do not penetrate the fabric and blow into the face of the occupant. To operate in this matter, fabrics for use in airbag construction should be lightweight but strong, relatively airtight, packable or foldable into a confined area, and resistant to abrasion. Thus, the characteristics or parameters which are important for airbag fabrics include low air permeability, low weight, low thickness, and high strength.

Earlier fabrics for airbag construction achieved low air permeability by coating the fabric with a rubber such as chloroprene. Such coated fabrics used in the construction of airbags have several disadvantages. In addition to the higher cost of coating, the coating of a fabric adds both thickness and weight to the product which increases the space requirements for the airbag in the folded condition, which may be a very important consideration. Rubber coated fabrics may also have a tendency to stick or block during the long term compressed storage of the bag, which can be a serious drawback. In order to prevent sticking of the layers, the coated layer is often treated with talc or other treatments, which also increases the costs. Further, some fabric coatings may increase the tendency of the fabric to become brittle, which would provide for a shorter life expectancy.

In the last several years, alternatives to coating have been sought. The first alternative is a fabric which achieves low air permeability by utilizing fibers which are heat shrinkable. Once the fabric is formed, the fibers are heat shrunk, heat-set, and optionally calendared to achieve the low air permeabilities necessary. Even with calendering, the weave construction must be rather dense and this leads to a heavier construction. The calendering operation is an additional operation which adds to the cost of the fabric.

One approach to an uncoated fabric for airbags is described in U.S. Pat. No. 5,093,163. In this approach, the airbag fabric is formed from heat shrinkable, synthetic filament yarns woven in thread counts of more than 56 threads per inch. After heat shrinkage, there results a very dense and heavy fabric.

Another attempt to provide an uncoated fabric for airbags is described in U.S. Pat. No. 5,236,775 issued Aug. 17, 1993. The fabric described in the '775 patent is woven on conventional weaving equipment with thread counts again in excess of 56 threads per inch with approximately 65 threads per inch being preferred. No heat setting, shrinking, or calendering is contemplated, however, again, this is obviously a relatively dense, heavy fabric.

SUMMARY OF THE INVENTION

In the present invention, it has been found that an uncoated, airtight fabric for airbags can be woven, utilizing yarns similar to those described above but with considerably fewer yarns per inch, resulting in a lighter weight, less dense fabric if the fabric is woven on a fluid jet loom. For some reason, the action of the fluid jet loom bulks or expands the synthetic, continuous, multi-filament yarns to the extent that coating, calendering, heat shrinkage, or other similar post weaving finishing operations are not necessary. Utilizing this technique, uncoated fabrics for airbags which exhibit an air permeability that satisfies current requirements (for example, the most common General Motors requirement calls for air permeability less than 4 cfm per $ft^2$ of surface area at air pressure of one-half inch of water) are achievable utilizing a smaller thread count in both yarn directions than is achievable in uncoated fabrics formed of the same yarns on conventional weaving apparatus. For example, utilizing a 420 denier yarn, a weave construction having a thread count of 46×46 results in air permeabilities of 1.5 cfm per/$ft^2$ of surface area. This compares with air permeabilities with the same thread count on rapier looms of approximately 9 cfm. Therefore, at certain lower thread densities, the use of the fluid jet loom decreases the air permeability of similar fabrics by 75% or more when compared to a rapier loom.

It is therefore an object of the present invention to provide an uncoated airbag fabric formed of synthetic, continuous multi-filament yarns, which is extremely simple to manufacture, exhibits substantially low air permeabilities, lower fabric weights, lower fabric thicknesses than achieved herebefore, while maintaining good fabric strengths.

It is another object of the present invention to provide an airbag fabric as described above which is formed on a fluid jet loom and exhibits an air permeability of less than 4 cfm per $ft^2$ of surface area at air pressures of less than one-half inch of water.

DETAILED DESCRIPTION OF THE PREFERRED EMBODIMENTS

Figure 1:
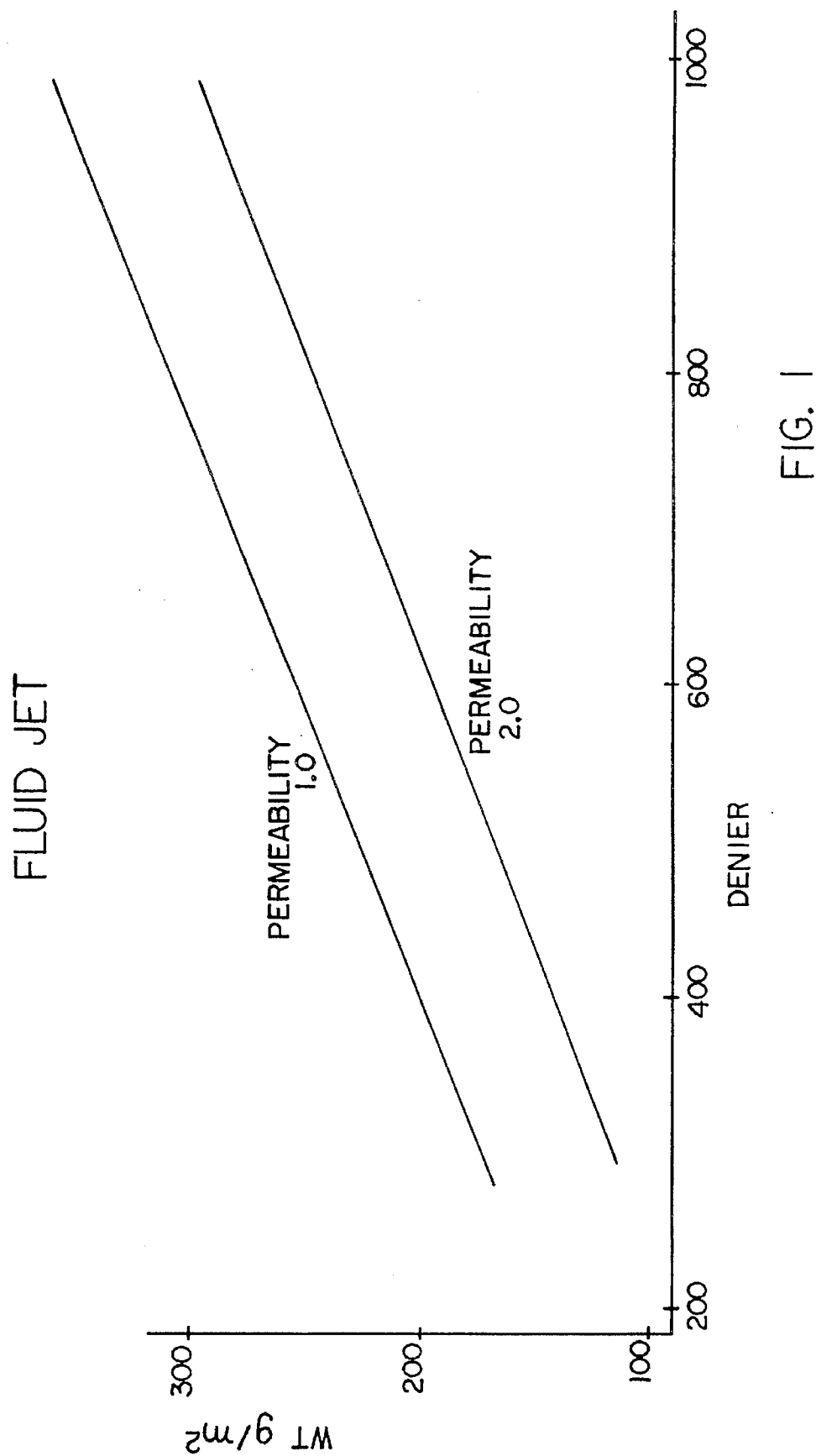
FIG. 1 is a graphical illustration showing the relationship of fabric weight to yarn denier at various levels of air permeabilities for fluid jet looms.

In airbags, as a general rule, it is desirable for the fabric to exhibit approximately the same strength in both thread directions. This feature may be achieved by utilizing approximately the same thread counts in both the warp and weft or fill directions. The thread count may differ somewhat, but is generally within 10% of being the same. For example, a good construction of 420 denier nylon 6,6 yarn may be achieved by 46 yarns/inch in the warp direction and 46 yarns/inch in the weft direction. Additionally, the yarns utilized in both the warp and weft directions are preferably the same type of yarn, i.e., having the same denier and other properties.

The airbag fabric of the present invention is uncoated and uncalendered, and achieves the necessary air permeability characteristics with a substantially lower thread count in both directions. This results in a lighter weight, a more easily foldable and unfoldable airbag which may be manufactured more economically. The air permeability tests and other relevant tests show surprisingly good results compared to fabrics formed by previously known weaving techniques. The heart of the invention lies in the use of fluid jet looms, preferably water jet looms, in the weaving process rather than the conventional rapier or projectile-type looms. Such fabric exhibits an extremely low gas permeability and can be made in much lighter weight, with less stiffness and bulk, and with a minimum weave density.

The yarns utilized are preferably continuous, multi-filament, synthetic yarns such as polyolefin, polyester, or polyamides such as nylon 6,6. It is believed that continuous, multi-filament synthetic yarns having deniers in the range of 200–900 may be utilized successfully in this process. The filament denier in the multifilament yarns should preferably be about 6 denier per filament.

As stated hereinabove, the heart of the invention lies in the formation of the fabric with a fluid jet loom, preferably a water jet loom. Water jet looms provided a more coherent jet than air jet looms, which jet does not break up so easily. The propulsive zone is elongated and is, therefore, more effective. Water jet looms are very effective in terms of energy requirements and are extremely quiet. If and when the jet breaks, it divides into droplets which create very little turbulence to disturb the filling. In normal operation, the droplets spread in such a way as to wet much of the warp. Further, water jet looms are extremely fast compared to other type of looms.

It has been found that the weave pattern can vary. For purposes of the present invention, it is possible to use fabrics of a wide range of weaves, for example, a plain, 1×1 weave works very well.

A wide range of yarns may be utilized for the airbag fabric of the present invention. One yarn which has been found to provide excellent results is a commercial nylon type 6,6 yarn, T-743, available from DuPont. This yarn has the following properties:

| Denier | 420 |
| Breaking strength | 3.5 kgf |
| Tenacity | 8.5 g/d |
| Breaking extension | 17% |
| Melting Point | 256° C. |
| Filaments | 68 |

These strength and extension values insure that the fabric is suitable for absorbing the energy of the explosive expansion of the airbag.

By use of the present invention, it has been found that excellent results are achieved in fabrics formed of a 630 denier T-728 yarn woven in a 1×1 plain weave with 40 yarn ends in both the warp and weft direction. It is believed a good range of yarn density would be between 38 and 42 yarns per inch for 630d. It is not necessary that the number of yarn ends per inch be the same in the warp and weft direction as some variation can occur. Excellent results have also been achieved utilizing a 420 denier, T-743 yarn woven in a 46×46 plain weave construction (44–48 being a preferred range); and a 315 denier T-729 yarn woven in a 56×56 weave construction (53–59 yarns per inch being a preferred range).

By the term "excellent results," it is meant that from tests utilizing the ASTM Test Method (D-737) it has been determined that the above fabrics exhibit an air permeability of approximately 1 to 4 cfm per ft$^2$ of surface area at a stated pressure of one-half inch of water. This compares with tests of substantially the same yarns formed in substantially the same patterns on a rapier loom which exhibit air permeabilities of approximately 6 to 14 cfm per ft$^2$ of area at the same pressures. This is a remarkable and very unexpected result. The advantages of the fabric according to the invention result in a safer and more reliable airbag system which conforms to the performance specifications of automobile manufacturers. The invention will further be described by reference to the following examples.

EXAMPLE 1

A continuous multifilament polyamide type (nylon 6,6) yarn having a denier at 420 and a filament count of 68 was formed into a plain 1×1 square woven fabric or a Nissan LW 541 190 cm water jet loom.

The loom shed was set with 280 mm heddle length, harness cross point height of 122 mm and harness cross timing of 340°. The fill yarn insertion was accomplished with a 48 mm nozzle powered by a 24 mm pump and 120 mm cam which was set for a 11.5 mm stroke. The filling yarn insertion timing was set at 85° jet, 95° open grip, 265° closed grip and 10° cut.

The thread count after this fabric was washed and heatset on a tenter frame was 46 yarns per inch in both the warp and weft directions.

EXAMPLE 2

A continuous multifilament polyamide type (nylon 6,6) yarn having a denier of 420 and a filament count of 68 was formed into a plain 1×1 square woven fabric on a Ruti F-2001 rapier loom. The loom shed was set with a 72 mm opening and a 320° cross point. The filling insertion rapiers were set to travel 90 mm past the center line on the left side and 50 mm past the center line on the right side at the 180° timing point. The filling insertion timing was set to cut at 75°, weft brake at 150° and weft brake stop at 290°. The thread count after this fabric was washed and heatset on a tenter frame was 46 yarns per inch in both the warp and weft directions.

EXAMPLE 3

A continuous multifilament polyamide type (nylon 6,6) yarn having a denier of 420 and a filament count of 68 was formed into a plain 1×1 square woven fabric on a rapier loom as in Example 2. A different warp set and reed was used to increase the number of warp yarns per inch. The loom take-up speed was adjusted to increase the number of weft yarns per inch. The thread count of this fabric after it was washed and heatset was 49 yarns per inch in both the warp and weft directions.

EXAMPLE 4

A continuous multifilament polyamide type (nylon 6,6) yarn having a denier of 630 and a filament count of 102 was formed into a plain 1×1 square woven fabric on a water jet loom as in Example 1. The thread count of this fabric after it was washed and heatset was 40 yarns per inch in both the warp and weft directions.

EXAMPLE 5

A continuous multifilament polyamide type (nylon 6,6) yarn having a denier of 630 and a filament count of 102 was formed into a plain 1×1 square woven fabric on a rapier loom as in Example 2. The thread count of this fabric after it was washed and headset was 40 yarns per inch in both the warp and weft directions.

EXAMPLE 6

A continuous multifilament polyamide type (nylon 6,6) yarn having a denier of 630 and a filament count of 102 was formed into a plain 1×1 square woven fabric on a rapier loom as in Example 5. The warp set and reed were changed to allow an increase in the number of warp yarns per inch. The take-up speed was adjusted to increase the number of weft yarns per inch. The thread count of this fabric after it was washed and heatset was 42 yarns per inch in both the warp and weft directions.

The fabrics of Examples 1–6 were tested for air permeability and mass, and the results appear in Table I below:

TABLE I

| Example | 1 | 2 | 3 | 4 | 5 | 6 |
|---|---|---|---|---|---|---|
| Yarn Denier | 420 | 420 | 420 | 630 | 630 | 630 |
| Fabric Construction | 46 × 46 | 46 × 46 | 49 × 49 | 40 × 40 | 40 × 40 | 42 × 42 |
| Loom Type | Water Jet | Rapier | Rapier | Water Jet | Rapier | Rapier |
| Permeability, ft$^3$/ft$^2$/min. | 1.45 | 8.70 | 2.94 | 1.25 | 8.10 | 2.62 |
| Mass, g/m$^2$ | 175 | 175 | 195 | 235 | 235 | 245 |

Figure 2:
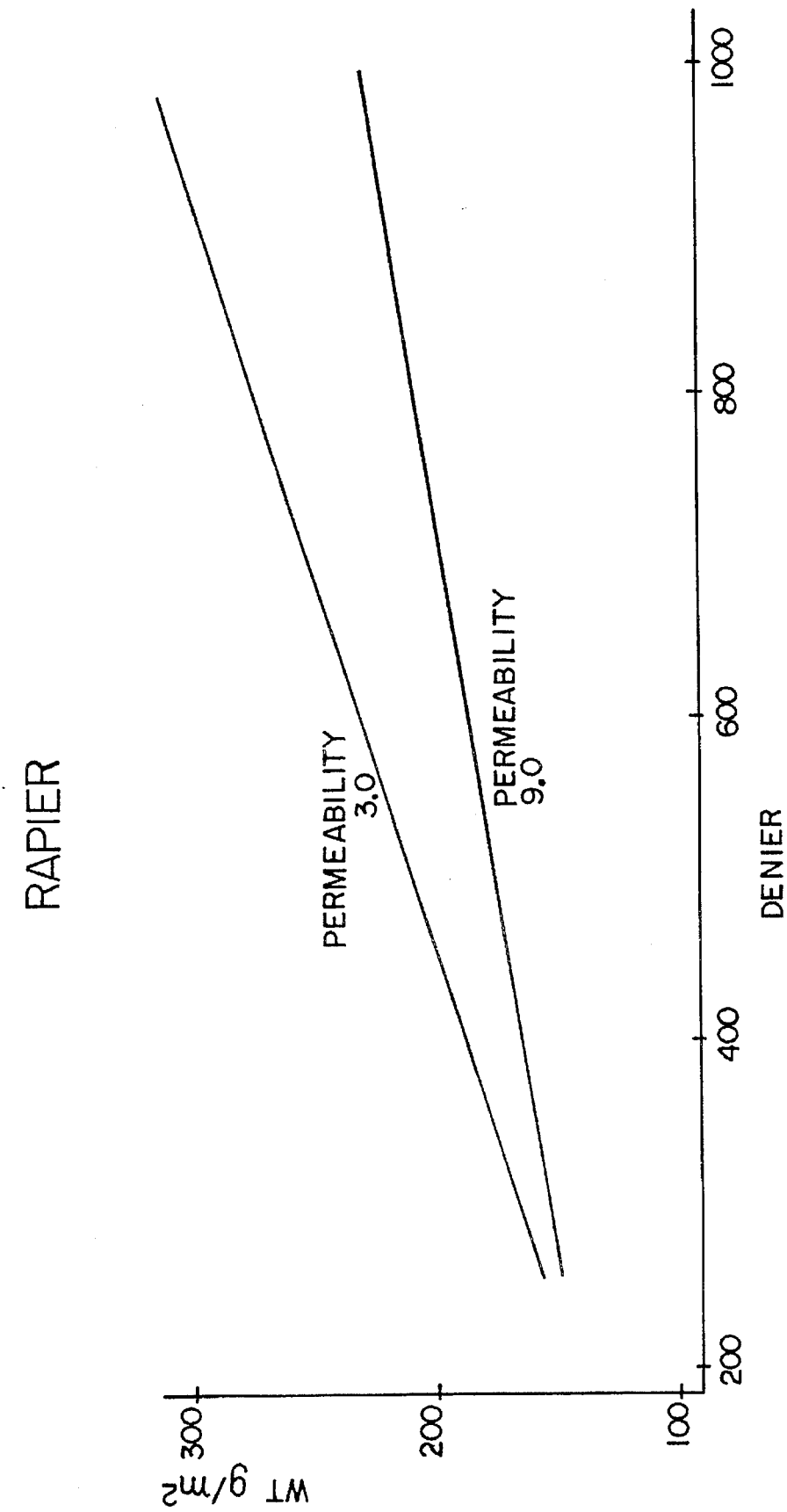
FIG. 2 is a graphical illustration showing the relationship of fabric weight to yarn denier at various levels of air permeabilities for rapier looms.
Figure 3:
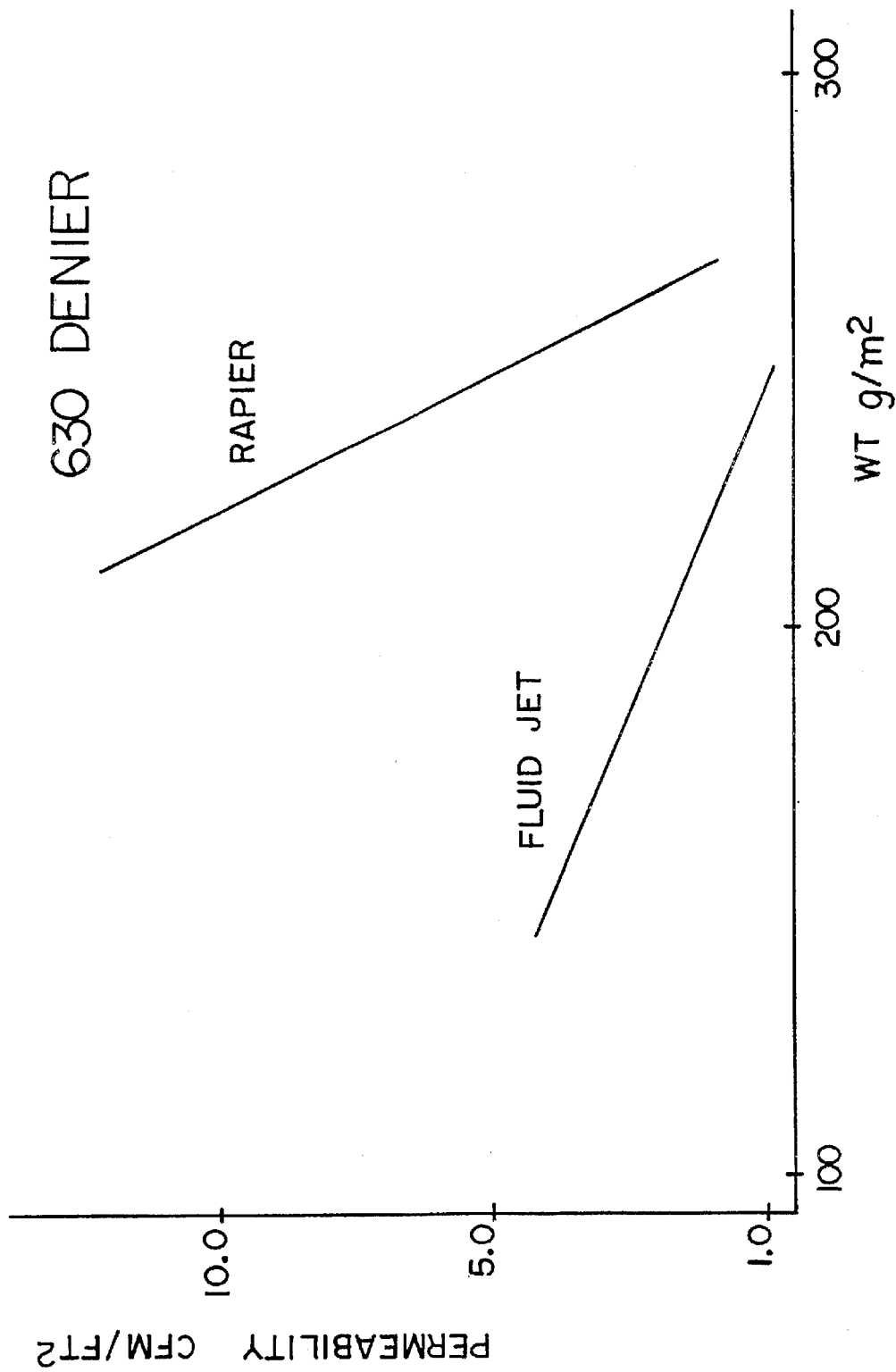
FIG. 3 is a graphical illustration showing the relationship of air permeability to fabric weight for various fabric construction techniques at about 420 denier.

The results of Table 1 are plotted and analyzed in FIGS. 1–3. All of the curves are approximated, but the general trend of lower fabric weight for prescribed air permeability requirements is evident. First in FIG. 1, each of the plotted lines show a level of air permeability achieved by fluid jet looms for given weights and deniers. FIG. 2 is similar, except for rapier looms. Note that for any given weight and denier, the air permeability of the fabric formed on the fluid jet loom is significantly lower. In the same manner, FIG. 3 shows that in a fabric formed from a 630 denier yarn, a prescribed weight of the fabric formed on a fluid jet loom results in an air permeability of less than one-half that of a fabric formed on a conventional rapier loom.

What is claimed is:

1. A fluid jet woven, uncoated airbag fabric formed of multi-filament synthetic yarns having an air permeability of less than 4 cfm per foot$^2$ of surface area at air pressures of less than one-half inch of water.

2. The airbag fabric of claim 1 whereby said fabric is formed on a water jet loom.

3. The airbag fabric according to claim 1 wherein said synthetic yarns are selected from the group containing polyester, polyarnide, and polyolefin.

4. The airbag fabric according to claim 1 wherein said synthetic yarn has a denier of 630, and said fabric is woven with a thread count of 38–42 yarn ends per inch in both thread directions.

5. The airbag fabric according to claim 1 wherein said synthetic yarn has a denier of 420, and said fabric is woven with a thread count of 44–48 yarn ends per inch in both thread directions.

6. The airbag fabric according to claim 1 wherein said synthetic yarn has a denier of 315, and said fabric is woven with a thread count of 53–59 yarn ends per inch in both thread directions.

7. An airbag formed of a fluid jet woven, uncoated, fabric formed of multifilament synthetic yarns, said fabric having an air permeability of less than 4 cfm per foot$^2$ of surface area at air pressures of less than one-half inch of water.

8. The airbag of claim 7, wherein said synthetic yarns are selected from the group consisting of polyester, polyarnide and polyolefin yarns.

9. The airbag of claim 7, wherein said fabric is woven on a water jet loom from nylon yarns.

10. The airbag of claim 7, wherein said fabric is woven of 315 denier yarn in a weave construction of 53–59 yarns per inch in both the warp and weft directions.

11. The airbag of claim 7, wherein said fabric is woven of 420 denier yarn in a weave construction of 44–48 yarns per inch in both the warp and weft directions.

12. The airbag of claim 7, wherein said fabric is woven of 630 denier yarn in a weave construction of 38–42 yarns per inch in both the warp and weft directions.

* * * * *